United States Patent
Ananthanarayanan et al.

(10) Patent No.: US 9,563,434 B2
(45) Date of Patent: Feb. 7, 2017

(54) MINING DEPENDENCIES FROM DISK IMAGES

(75) Inventors: Rema Ananthanarayanan, New Delhi (IN); Vinatha Chaturvedi, Karnataka (IN); Vijil E. Chenthamarakshan, Kerala (IN); Prasad M. Deshpande, Mumbai (IN); Raghuram Krishnapuram, New Delhi (IN); Shajeer K. Mohammed, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1981 days.

(21) Appl. No.: 12/698,733

(22) Filed: Feb. 2, 2010

(65) Prior Publication Data

US 2011/0191762 A1    Aug. 4, 2011

(51) Int. Cl.
G06F 9/44    (2006.01)
G06F 17/30   (2006.01)

(52) U.S. Cl.
CPC ........... *G06F 9/44* (2013.01); *G06F 17/30* (2013.01)

(58) Field of Classification Search
USPC ........................................................ 717/170
See application file for complete search history.

(56) References Cited

U.S. PATENT DOCUMENTS

| | | | |
|---|---|---|---|
| 6,381,742 B2 | 4/2002 | Forbes et al. | |
| 6,442,754 B1 | 8/2002 | Curtis | |
| 7,222,341 B2 | 5/2007 | Forbes et al. | |
| 7,472,132 B2 * | 12/2008 | Ho et al. | |
| 2003/0093420 A1 | 5/2003 | Ramme | |
| 2006/0026157 A1 * | 2/2006 | Gupta et al. | 707/6 |
| 2007/0150887 A1 | 6/2007 | Shapiro | |
| 2008/0201705 A1 | 8/2008 | Wookey | |
| 2009/0100415 A1 | 4/2009 | Dor et al. | |

OTHER PUBLICATIONS

Shasha, Dennis, et al., "Exact and Approximate Algorithms for Unordered Tree Matching", IEEE Transactions on Systems, Man and Cybernetics, Apr. 1994, pp. 668-678, vol. 24, No. 4.
Zhang Kaizhong, et al., "On the editing distance between unordered labeled trees", Information Processing Letters, May 1992, pp. 133-139, vol. 42, No. 3, Elsevier Science Publishers B.V.
www.hpl.hp.com/personal/Carl_Staelin/mkpkg/help/mkpkg.html, Mkpkg, Determine Dependencies.
German, Daniel; Barahona, Jesus M.; Robles, Gregorio, "A Model to Understand the Building and Running Inter-Dependencies of Software", IEEE Computer Society.

* cited by examiner

*Primary Examiner* — Idriss N Alrobaye
*Assistant Examiner* — Brooke Taylor
(74) *Attorney, Agent, or Firm* — Ference & Associates LLC

(57) ABSTRACT

Methods and arrangements for automatically finding the dependency of a software product on other software products or components. From an install image or directory, a signature is found by deriving the same from a directory structure of the software. Further, a directory tree structure is built and an approximate sub-tree matching algorithm is applied to find commonalties across software products.

14 Claims, 3 Drawing Sheets

MINING DEPENDENCIES FROM DISK IMAGES

BACKGROUND

When new software products are introduced to market, it is often the case that they will bear dependencies on other software components or products. The number and nature of such dependencies over the full range of products is certainly vast and complex, and currently there is no centralized or universal source of data regarding such dependencies.

Clearly, numerous problems can result from this. For instance, multiple copies of the same software product can be distributed, resulting in software "bloat". If "Product A" depends on products "B" and "C", while "C" depends on "B", then this can needlessly result in two copies of "B" being distributed with each "A". Or, one may consider a common product such as the Java "Run Time Environment". Inasmuch as a number of software programs can well rely on this, a number of different products may well have a copy of the Java "Run Time Environment" on a disk for distributing each product. Accordingly, if three different and independent programs are installed on a machine, the same machine can end up having three copies of the Java "Run Time Environment".

Further, it can be appreciated that different products may well employ different versions of products with which a dependency exists, meaning that an inefficient degree of hypervigilance needs to be applied when releasing a product (e.g., in the above example, at a given point in time, "A" might depend on one version of "B" while "C" might depend on another version of "B").

An undesirable result of the above-described conventional scenarios can be the distribution and installation of multiple copies of a product at a machine, leading to increased disk space usage and maintenance problems.

Two conventional approaches have sought to mitigate such problems. In a first approach, each product bears or creates a unique signature to identify itself and registers with a common inventory database when it is installed. However, this requires changes to be made to the product, which may well not be suitable in the case of legacy products and acquired products. In another approach, a unique file or registry signature is created manually for each product. A prime disadvantage here is that the approach is not scalable for potentially thousands of products to which it may be applied. Also, as the signature is identified without the consent of a product team, manual effort typically must be expended to identify the signatures for each new release.

BRIEF SUMMARY

Broadly contemplated herein, in accordance with at least one presently preferred embodiment of the present invention, are simplified and automated arrangements and methods for extracting dependency data from packages of bundled products, thus permitting more efficient installation and disk space usage in connection with the bundled product.

Broadly contemplated herein, in accordance with at least one presently preferred embodiment of the present invention, is the extraction of files from a product install image and/or install directory, and the identification of common components from from file hierarchies. Preferably, once the common components are identified, an automated or manual labeling process can be employed to identify all components at hand. Different versions of the same component can be identified with suitable labels or content, and a dependency graph may be created that can subsequently be used for analysis.

Generally, inasmuch as software programs are often distributed on media such as compact discs (CD's), there is broadly contemplated herein, in accordance with at least one presently preferred embodiment of the present invention, the identification of software dependencies across products, without actually having to run the CD or install a product from the CD. Further contemplated is the elimination of any duplicates that are discovered.

In summary, one aspect of the invention provides an apparatus comprising: one or more processors; and a computer readable storage medium having computer readable program code embodied therewith and executable by the one or more processors, the computer readable program code comprising: computer readable program code configured to extract a file system structure corresponding to a software product; computer readable program code configured to identify, from the file system structure, candidate subtrees that are likely to be subtrees of more than one directory across at least two software products; and computer readable program code configured to indicate common components across at least two software products.

Another aspect of the invention provides a method comprising: extracting a file system structure corresponding to a software product; identifying, from the file system structure, candidate subtrees that are likely to be subtrees of more than one directory across at least two software products; and indicating common components across at least two software products.

Furthermore, an additional aspect of the invention provides a computer program product comprising: a computer readable storage medium having computer readable program code embodied therewith, the computer readable program code comprising: computer readable program code configured to extract a file system structure corresponding to a software product; computer readable program code configured to identify, from the file system structure, candidate subtrees that are likely to be subtrees of more than one directory across at least two software products; and computer readable program code configured to indicate common components across at least two software products.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
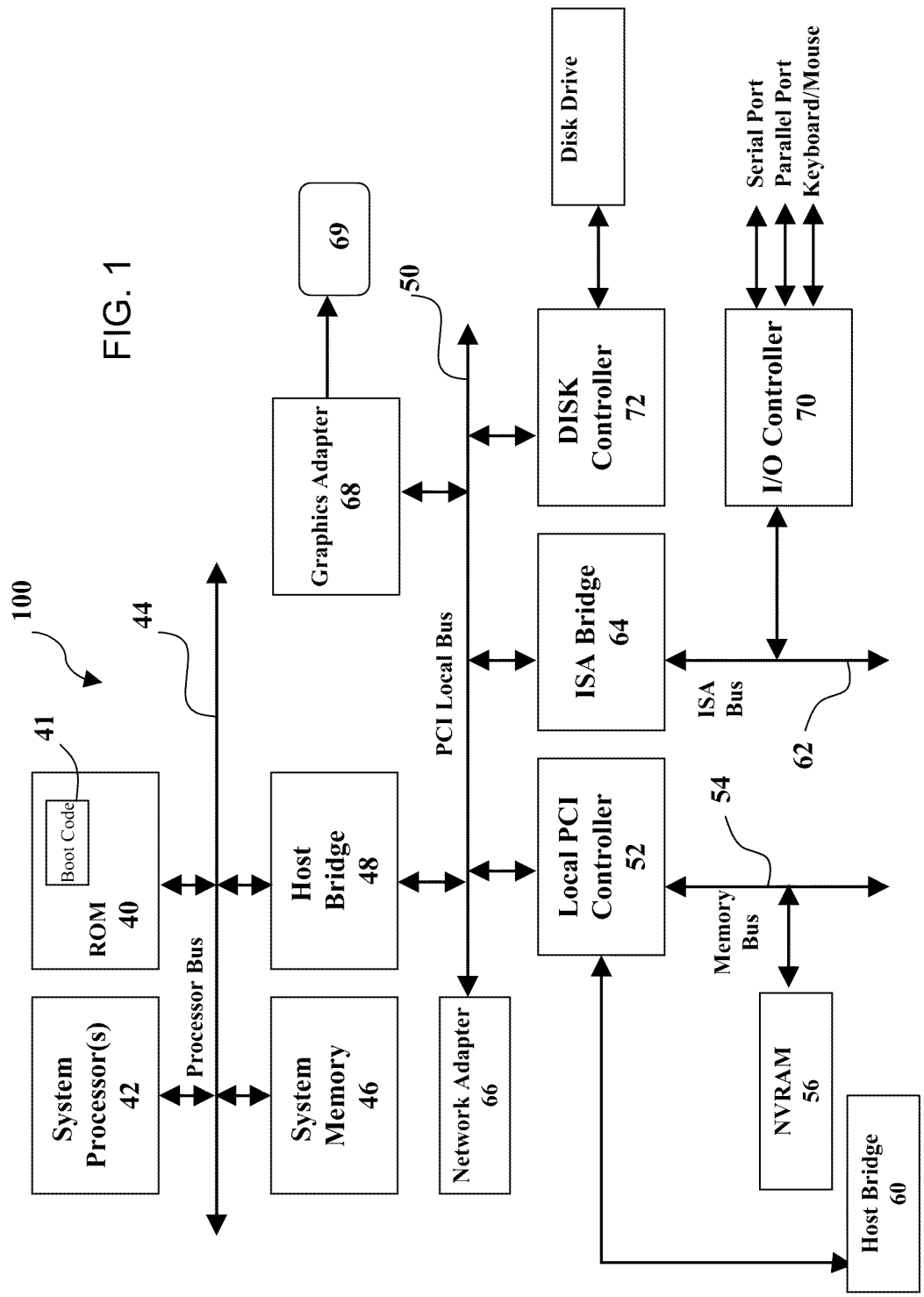
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

From the discussion herein, it will come to be appreciated that there is broadly contemplated herein, in accordance with at least one presently preferred embodiment of the present invention, a method of automatically finding the dependency of a software on other software products/components for installation and operation. Preferably, from the install image/install directory, one may find the signature by deriving it from the directory structure of the software. One may then build a directory tree structure and employ an approximate sub-tree matching algorithm to yield commonalties across software products. A significant advantage enjoyed is that the storage of multiple copies of a given software product or program at a single machine is avoided.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

The disclosure now turns to an algorithm, for identifying common software components, that may be employed in accordance with at least one presently preferred embodiment of the present invention.

Figure 2:
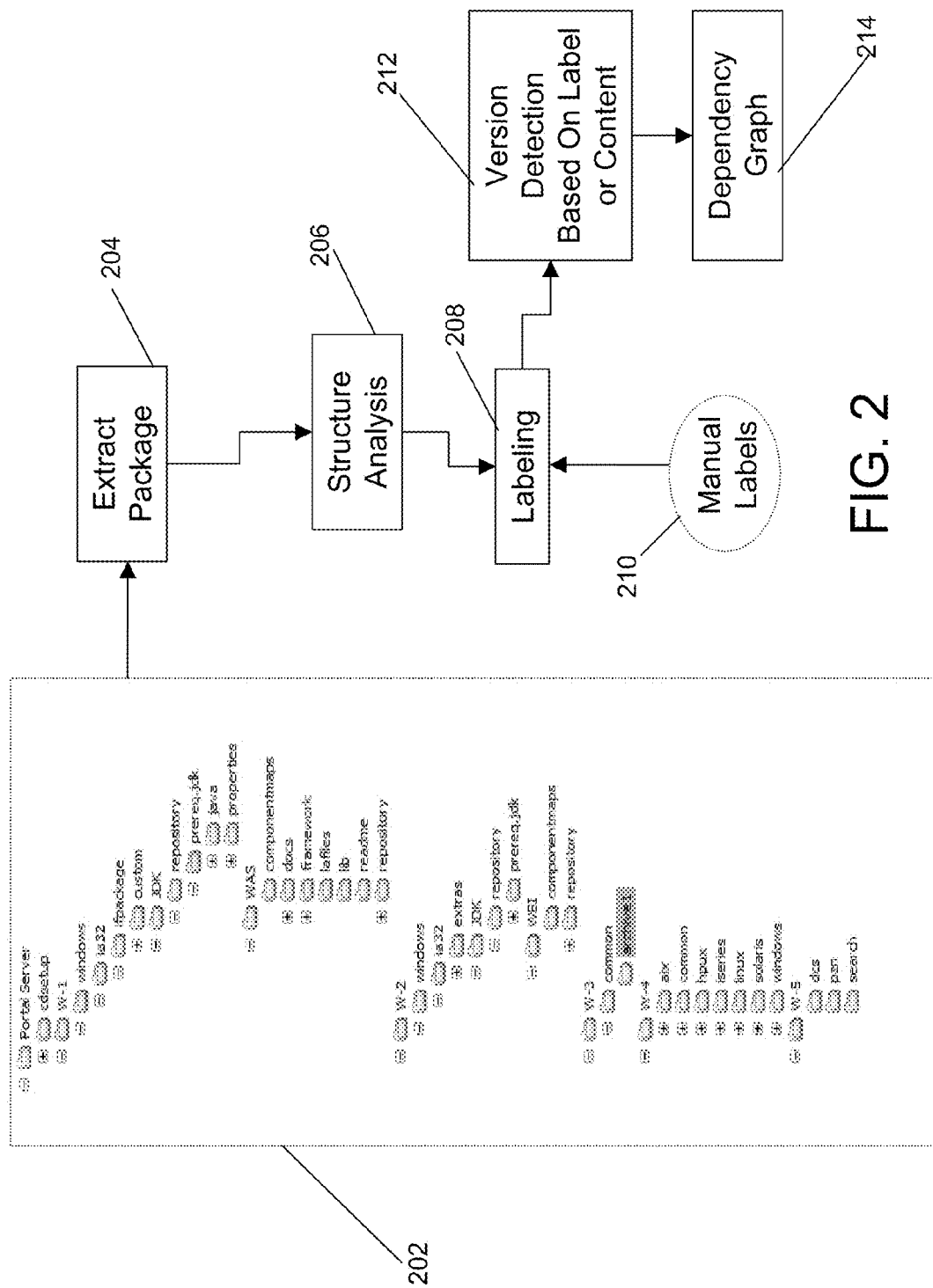
FIG. 2 schematically illustrates process steps of an algorithm.
Figure 3:
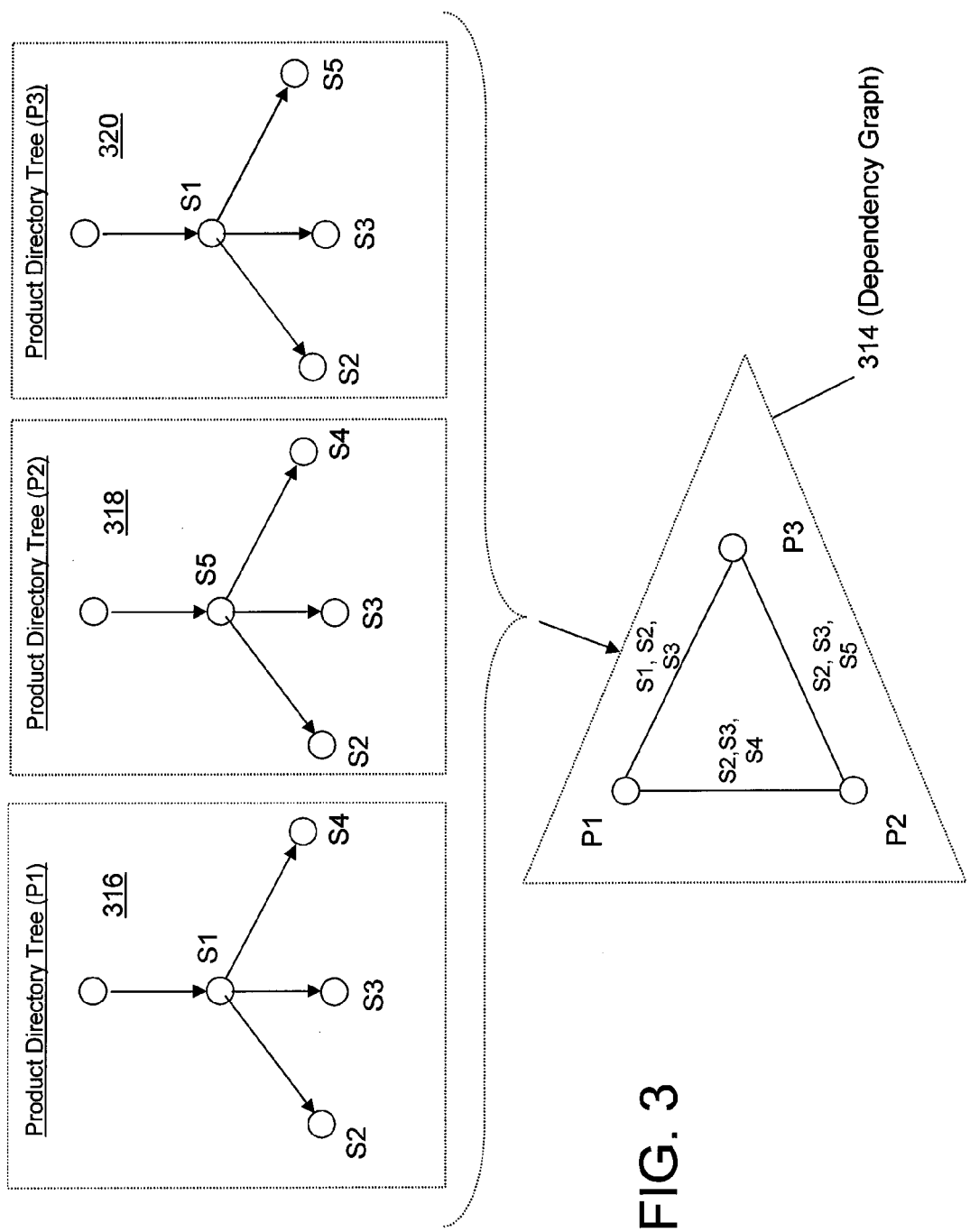
FIG. 3 schematically illustrates the input and results of a sample algorithm run.

FIG. 2 schematically illustrates process steps of an algorithm according to an embodiment, while FIG. 3 schematically illustrates the input and results of a sample algorithm run. Continued reference may be made to both of these figures. It will be appreciated that the processes and arrangements broadly contemplated in accordance with FIGS. 2 and 3 may be run on essentially any suitable computer system, such as that indicated at 100 in FIG. 1.

In the context of the present discussion, addressing a non-restrictive and illustrative example of an application according to an embodiment of the present invention, it can be understood that a software product, from which it is desired to determine dependencies, creates a unique signature to identify itself and registers with a common inventory database when it is installed.

Indicated at 202 is an install image or directory showing file hierarchies; these are extracted at step 204. Input is then provided for the next step, structure analysis (206) as now to be described.

As input, let D1 . . . Dn represent directory trees corresponding to Products P1 . . . Pn. As output, let S1 . . . Sk represent subtrees wherein each Si is an approximate subtree of Di, Dj and where i< >j and size(Si)>minSize (where "minSize" is a predetermined minimum size for a subtree). In conjunction with this step, the provision of approximate subtree matching is well known. (For background purposes here on approximate subtree matching, see, e.g., any or all of the following references: Dennis Shasha, Jason T. L. Wang, Kaizhong Zhang and Frank Y. Shih, "Exact and Approximate Algorithms for Unordered Tree Matching," *IEEE Transactions on Systems, Man and Cybernetics*, Vol. 24, No. 4, April 1994, pp. 668-678; Jason T. L. Wang, Kaizhong Zhang, Karpjoo Jeong and Dennis Shasha, "A System for Approximate Tree Matching," *IEEE Transactions on Knowledge and Data Engineering*, Vol. 6, No. 4, August 1994, pp. 559-571; Jason T. L. Wang, Bruce A. Shapiro, Dennis Shasha, Kaizhong Zhang and Kathleen M. Currey, "An Algorithm for Finding the Largest Approximately Common Substructures of Two Trees," *IEEE Transactions on Pattern Analysis and Machine Intelligence*, Vol. 20, No. 8, August 1998, pp. 889-895.)

Thus, given a subtree S, an objective here is to find all subtrees Si in a tree D that are approximately similar to S.

In accordance with at least one presently preferred embodiment of the present invention, an objective is also to identify candidate subtrees Si, that are likely to be subtrees of more than one Di. To this end, for each pair of directory trees Di, Dj, start with minimal subtrees greater than the threshold (e.g., minSize as set forth further above) in Di. For each of these subtrees, find matches in Dj (using known methods as touched upon above). Next, expand the tree upwardly to find the maximal match satisfying the matching threshold. Thence, output the maximal match.

In a labeling step 208, once common components are identified in a manner such as set forth above, preferably a label for each Sk is aimed to be identified. The labels can be identified using a signature for each Sk, using text mining on file contents, or via a manual process (210).

In accordance with a step of version detection based on labels (212), it can be appreciated that sometimes there might be a common tree structure across products indicating a common dependency. However, the dependency could be for a different version. Accordingly, these cases may be identified by analyzing the labels generated in step 208 as well as the content. As such, a dependency graph may preferably be generated (214) based on the labels and the dependencies identified.

FIG. 3 schematically illustrates the input and results of a sample algorithm run in accordance with an embodiment of the invention. Three product directory trees 316/318/320 are shown, corresponding respectively to products P1/P2/P3. By applying an algorithm such as that described and illustrated with respect to FIG. 2, a dependency graph 314 can be created. Here, dependency graph 314 shows, by way of illustrative and non-restrictive example, that products P1 and P3 have subtrees S1/S2/S3 in common, that P3 and P2 have S2/S3/S5 in common and that P1 and P2 have S2/S3/S4 in common.

It will be appreciated that, in accordance with at least one presently preferred embodiment of the present invention, several functional advantages can arise. Generally, product packaging can be made leaner by removing duplicated components. Further, software reuse becomes facilitated and a consistent, stable and simpler software stack is afforded, thereby inviting savings on software maintenance and support costs. Technical architects will be able to make use of a broad picture of software dependencies and, with such a "bird's eye" view, can easily identify potential areas of simplification and reuse.

It will also be appreciated that costs associated with porting applications to new platforms can be greatly reduced. Solution architects will be able to make use, e.g., of a stack analysis report of various products in a solution showing the dependencies among products, and this of course will ultimately save considerable effort in the development and deployment of solutions. Finally, in the realm of inventory and license management, whereas conventional scanners use a file name, file size and file header from an individual file to identify a software product in inventory, methods and arrangements in accordance with at least one embodiment of the present invention will be more reliable in their use of a disk-image pattern.

In recapitulation, among the advantages associated with at least one embodiment of the present invention is the possibility of identifying dependent products (of a given software product) just by processing the install image. It is not necessary to install the product itself, in other words.

A hierarchical structure, as employed herein in accordance with at least one embodiment of the present invention, is significantly less error prone when compared to a conventional arrangement which relies single file signature-based recognition. Labels are preferably applied to subtrees using text mining techniques. Finally, embodiments of the invention distinguish in their disambiguation of multiple versions of a product, wherein a directory structure and its contents are analyzed.

It should be noted as well that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a computer readable storage medium having computer readable program code embodied therewith and executable by the one or more processors, the computer readable program code comprising:
      computer readable program code configured to extract a file system structure corresponding to a software product;
      computer readable program code configured to identify, from the file system structure, candidate subtrees that are likely to be subtrees of more than one directory across at least two software products; and
      computer readable program code configured to indicate common components across at least two software products.

2. The apparatus according to claim 1, further comprising computer readable program code configured to permit labeling of candidate subtrees.

3. The apparatus according to claim 2, comprising computer readable program code configured to permit labeling of candidate subtrees via ascertaining a signature of each candidate subtree.

4. The apparatus according to claim 2, comprising computer readable program code configured to permit labeling of candidate subtrees via employing text mining of file contents in each candidate subtree.

5. The apparatus according to claim 2, comprising computer readable program code configured to permit manual labeling of candidate subtrees.

6. The apparatus according to claim 1, comprising computer readable program code configured to identify, from the file system structure, candidate subtrees that are approximately similar to other subtrees across at least two software products.

7. The apparatus according to claim 1, comprising computer readable program code configured to identify maximal subtrees that are similar across at least two software products.

8. The apparatus according to claim 1, comprising computer readable program code configured to identify candidate subtrees above a minimum threshold size.

9. The apparatus according to claim 1, comprising computer readable program code configured to detect different versions of common components across at least two software products.

10. The apparatus according to claim 9, comprising computer readable program code configured to detect different versions of common components via analyzing labels associated with the components.

11. The apparatus according to claim 1, comprising computer readable program code configured for generating a dependency graph which indicates dependencies among common components across at least two software products.

12. The apparatus according to claim 1, comprising computer readable program code configured for registering a unique signature of a software product with a common inventory database.

13. The apparatus according to claim 1, wherein said computer readable program code is configured to extract a file system structure from an install image corresponding to the software product.

14. The apparatus according to claim 1, wherein said computer readable program code is configured to extract a file system structure without installing the software product.

\* \* \* \* \*